(12) United States Patent
Zhuang

(10) Patent No.: US 7,599,327 B2
(45) Date of Patent: Oct. 6, 2009

(54) METHOD AND APPARATUS FOR ACCESSING A WIRELESS COMMUNICATION SYSTEM

(75) Inventor: Xiangyang Zhuang, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 313 days.

(21) Appl. No.: 11/070,061

(22) Filed: Mar. 2, 2005

(65) Prior Publication Data

US 2005/0286465 A1 Dec. 29, 2005

Related U.S. Application Data

(60) Provisional application No. 60/582,602, filed on Jun. 24, 2004.

(51) Int. Cl.
*H04W 4/00* (2006.01)

(52) U.S. Cl. .................. 370/329; 370/203; 370/210
(58) Field of Classification Search .......... 370/329, 370/203, 208, 210, 330, 336, 394
See application file for complete search history.

(56) References Cited

U.S. PATENT DOCUMENTS

| | | | |
|---|---|---|---|
| 5,930,299 A | 7/1999 | Vannatta et al. | |
| 6,178,158 B1 * | 1/2001 | Suzuki et al. | 370/203 |
| 6,178,197 B1 | 1/2001 | Froelich et al. | |
| 6,788,728 B1 | 9/2004 | Prasad et al. | |
| 6,947,476 B2 * | 9/2005 | Song | 375/149 |
| 2004/0114504 A1 * | 6/2004 | Jung et al. | 370/203 |
| 2004/0131011 A1 * | 7/2004 | Sandell et al. | 370/210 |

OTHER PUBLICATIONS

Huy, Vu: The International Search Report or the Declaration, ISA/US, Alexandria Virginia, completed: Nov. 17, 2005, mailed: Feb. 22, 2006.

* cited by examiner

*Primary Examiner*—George Eng
*Assistant Examiner*—Marcos L Torres

(57) ABSTRACT

Access to a wireless communication system (100) by a subscriber station (101-103) is facilitated by selecting (705) an access sequence from a set of sequences that have been identified to have a low average of peak-to-average-power-ratios of access signals generated by the set of sequences and also based on a good cross-correlation of the access signals; forming (714) the access waveform by generating an access signal using the access sequence and appending in the time domain a cyclic prefix to the access signal; and transmitting (715) the access waveform. In some implementations, the access waveform is cyclically shifted (820) before the cyclic prefix is appended, and in some implementations, the signal is transmitted (710, 810) in a randomly selected sub-band of an access interval.

21 Claims, 6 Drawing Sheets

100

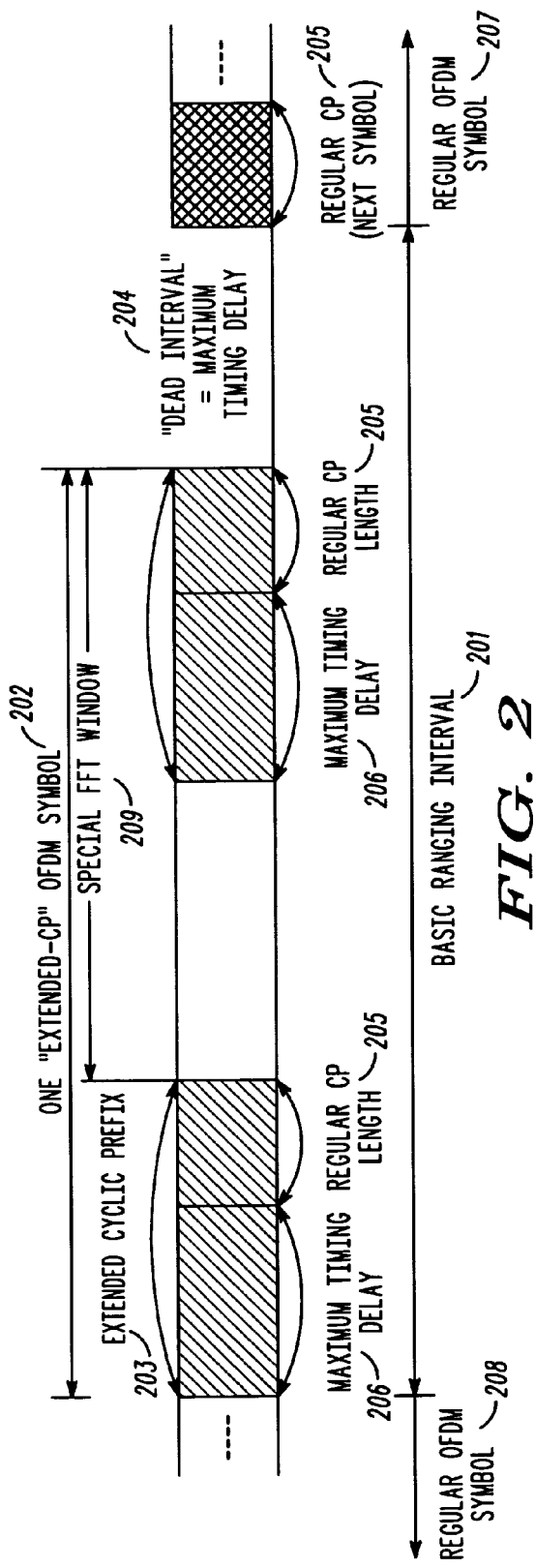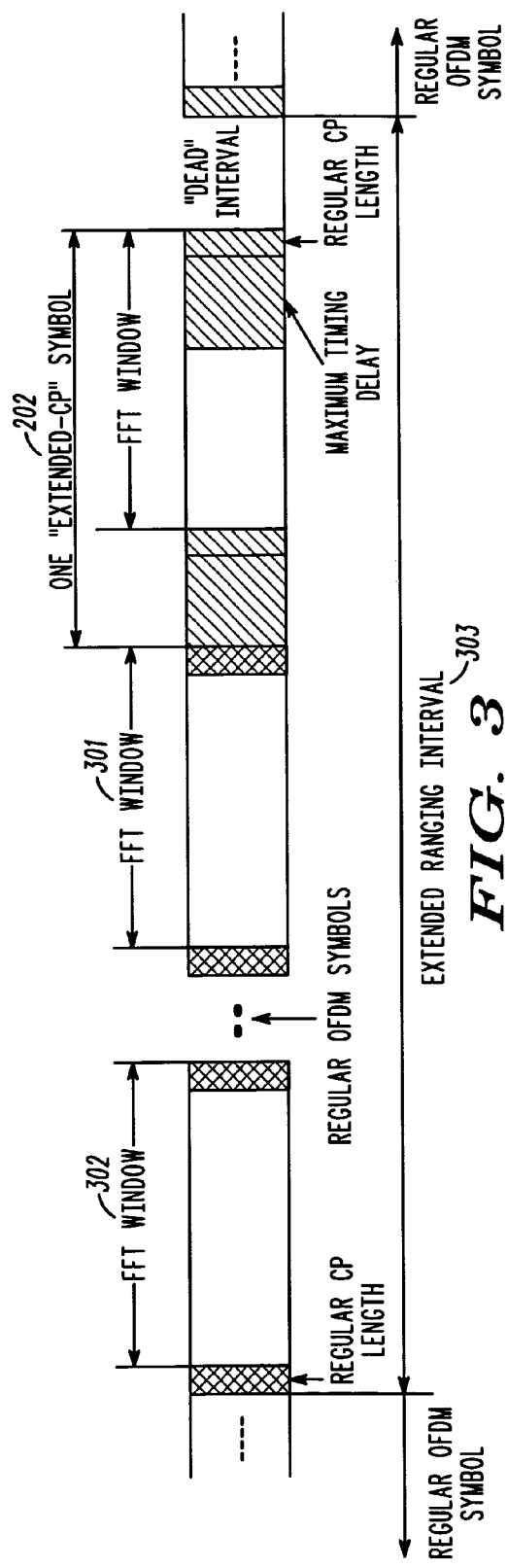

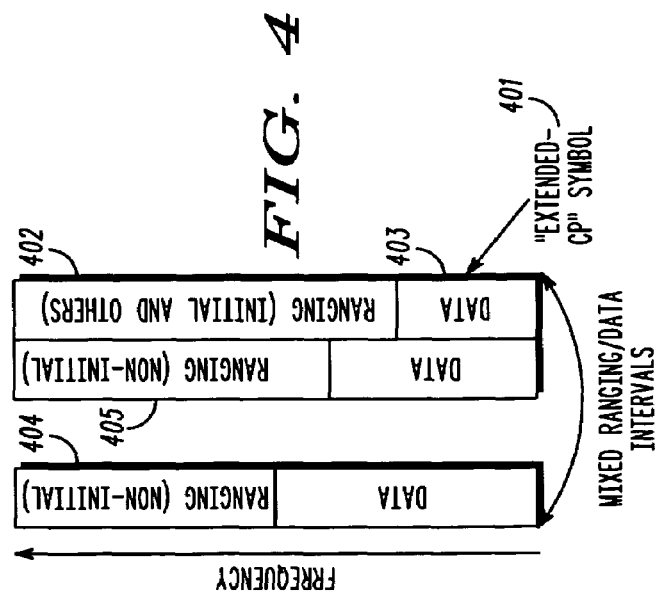

METHOD AND APPARATUS FOR ACCESSING A WIRELESS COMMUNICATION SYSTEM

FIELD OF THE INVENTION

The present invention relates generally to communication systems, and in particular, to a method and apparatus for randomly accessing a wireless communication system by a subscriber station in order to obtain or maintain such parameters as uplink timing, power control, channel estimation, and frequency alignment of the subscriber station.

BACKGROUND OF THE INVENTION

In a wireless communication system, it is critical to design a mechanism for allowing a remote subscriber station (SS) to access the network by sending an access signal to a Base Station (BS). The access signal fulfills important functions such as requesting resource allocation from the BS, alerting the BS of the existence of the SS that is trying to enter the network, and initiating a process that allows the BS to measure some parameters of the SS (e.g., timing offset caused by propagation, transmit power, etc.) that must be maintained and adjusted constantly in order to ensure a non-interfering sharing of the uplink resource. Unlike ordinary data traffic that is sent using scheduled resources that are allocated by the BS to the SS, such an access signal is often transmitted in an unsolicited manner. Therefore, this process is often referred to as a random access. Sometimes the process is also referred to as "ranging", as used in the Institute of Electrical and Electronic Engineers (IEEE) 802.16 standards, because the access signal can help the BS to measure the propagation distance from the SS (thus, its range). A parameter known as a timing advance offset is used by the SS to advance its transmission relative to the reference timing at the BS so that the signals from all the SS's appear synchronized at the BS (i.e., uplink timing synchronization). Once uplink timing synchronization is achieved, the SS orthogonality is ensured (i.e., each SS occupies its own allocated sub-carriers without interfering with other SS). In this specification, the terms "access", "random access", and "ranging" will be used interchangeably to describe these processes and also to describe the signal transmitted by the SS to initiate the access process.

The random access or ranging process includes an initial/handover ranging function for synchronizing an SS with a BS during the initial network entry or re-entry and during cell handoff, a periodic ranging function for maintaining SS synchronization, and a bandwidth request function that allows each SS to request uplink bandwidth allocation. These uplink ranging functions fulfill very important tasks that can significantly influence the user experience. For example, the bandwidth request ranging performance directly impacts the access latency perceived by a user, especially during communication sessions (e.g., HTTP) that consist of sporadic packet traffic that requires fast response, in which case high detection and low collision probabilities of the access request are very desirable. In another example, robust detection of an initial ranging signal is essential in order to allow a user to quickly enter the network or to be handed over to a new serving sector. Reliable extraction of the accurate timing offsets from the initial ranging signals is also critical for achieving uplink synchronization that ensures user orthogonality (i.e., to make sure that each SS occupies its own allocated sub-carriers without interfering with other SS). Other important information that the BS needs to extract from ranging includes power measurement, frequency synchronization, and channel impulse response estimation, etc. Therefore, there is a need for an efficient and flexible air interface mechanism that enables fast and reliable user access to the network.

BRIEF DESCRIPTION OF THE DRAWINGS

FIG. 2 is a time-domain diagram of a "basic" dedicated basic ranging interval, in accordance with some embodiments of the present invention.

FIG. 3 is a time-domain diagram of an extended dedicated ranging interval, in accordance with some embodiments of the present invention.

FIG. 4 is a frequency-domain diagram of a variation of the extended dedicated ranging interval, in accordance with some embodiments of the present invention.

FIG. 5 is a time-domain diagram of an example design for an OFDM system such as the one defined by the IEEE 802.16 standard.

DETAILED DESCRIPTION OF THE INVENTION

Figure 1:
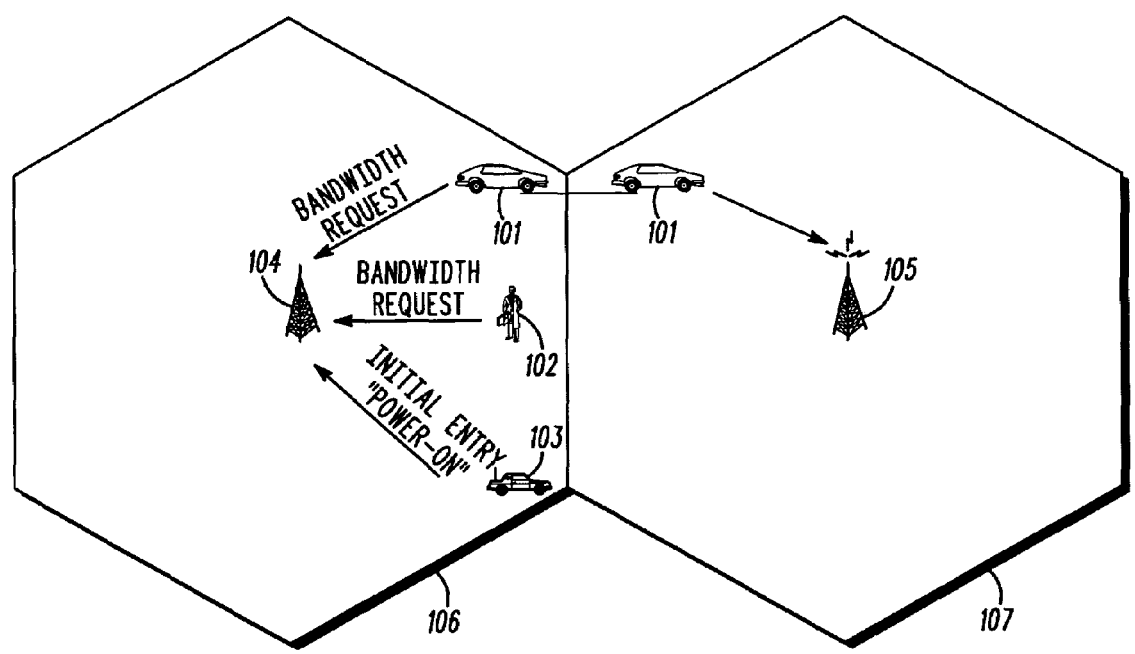
FIG. 1 is a block diagram of a communication system, in accordance with some embodiments of the present invention.

Before describing in detail the particular communication system accessing technology in accordance with the present invention, it should be observed that the present invention resides primarily in combinations of method steps and apparatus components related to accessing a communication system by a subscriber station. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Turning now to the drawings, wherein like numerals designate like components, FIG. 1 is a block diagram of communication system 100. Communication system 100 comprises a plurality of cells 106 and 107 (only two shown) each having a base station (BS) 104, 105. The service area of the BS 104 covers a plurality of subscriber stations (SSs) 101-103, each at a time may be performing some type of ranging function, which is also called herein a random access function. For example, SS 101 may move out of the service area of BS 104 and enter into the service area of BS 105, in which case a handover occurs that often involves a handover access. In other examples, SS 102 makes a bandwidth request and/or SS 103 makes an initial entry access when it is first activated within the communication system. In one embodiment of the present invention, communication system 100 utilizes an Orthogonal Frequency Division Multiplexed (OFDM) modulation or other variants of OFDM such as multi-carrier CDMA (MC-CDMA), multi-carrier direct sequence CDMA (MC-DS-CDMA). In other embodiments of the present invention, the multi-channel communication system 100 can use any arbitrary technology such as TDMA, FDMA, and CDMA.

Definition of Dedicated Ranging Zone

Referring to FIG. 2, a time-domain diagram shows a "basic" dedicated basic ranging zone 201 defined for an OFDM example system (the term "zone" is interchangeable herein with the term "interval" used in the figure), in accordance with some embodiments of the present invention. The duration of the dedicated basic ranging interval 201 consists of an interval of a special OFDM symbol 202 (denoted as "extended-CP" OFDM symbol) and a "dead interval" 204 that is a no-transmission interval equal to the maximum timing delay to be accommodated in the cell. The special OFDM symbol 202 has a duration equal to the sum of the duration of a special Fast Fourier Transform (FFT) window 209 and the duration of an extended cyclic prefix (CP) 203 wherein the CP represents the repeat of a portion of the signal as commonly known in OFDM. Hence, the special OFDM symbol is also referred to as an "extended-CP" OFDM symbol in FIG. 2. The special Fast Fourier Transform (FFT) window 209 may be chosen conveniently to be the same as a "regular" OFDM symbol period in an example deployment of an OFDM system, or other designed value (discussed later). The duration of the extended CP 203 equals to the sum of the duration of a "regular" CP 205 and the maximum timing delay 206 to be accommodated. The maximum timing delay is chosen based on the possible timing differences among all possible subscriber locations. This value directly relates to the round-trip propagation delay and the cell size. Meanwhile, the duration of a "regular" CP 205 within the extended CP 203 is the same as the CP length defined for regular data transmissions if the invention is used for an OFDM system. For other systems, the time duration of a regular CP is often chosen based on the excessive delay spread of the channels encountered in a deployment environment, which is also how the CP length is determined for OFDM systems. Lastly, as described above, the appended "dead" interval is chosen according to the maximal timing delay, A ranging signal is allowed to be transmitted only in the defined ranging interval. The ranging waveform itself is constructed as an OFDM symbol, i.e., by appending a CP of a certain length to a ranging signal. For convenience, we will use the term "waveform" to refer to the CP-included signal and the term "signal" for the CP-excluded portion only. The ranging waveform transmission starts from what the SS determines to be the right timing. For initial ranging users, that transmission point (i.e., the transmission start time) will be the beginning of the dedicated ranging interval according to the base reference plus the one-way propagation delay. The initial ranging SS should send at that point a waveform whose CP portion is of the length of an extended CP. For other ranging SS's that have already synchronized with the BS, the SS should have known the timing advance and transmit in advance to some reference point so that all the SS signals arrive at the BS at roughly the same time. In one embodiment, the non-initial ranging SS can either transmit a waveform with a regular CP at a timing point in advance to the start of 205 within 203 of FIG. 2, or transmit a waveform with an extended CP at a timing point in advance to the start of 203.

With the above definition of ranging interval, all types of ranging signals will not interfere with any transmission that precedes and follows the ranging interval, such as OFDM symbols 207 and 208 in an OFDM-based example system. The maximum timing delay should be large enough to accommodate the maximum propagation delay for SSs that have not adjusted their timing (i.e., initial ranging users). The maximum timing delay is a parameter determined based on the cell size. For the receiver processing at the BS, since the BS predefines the maximum timing delay and thus the extended CP length, the BS should know how to adjust the sampling position accordingly in order to extract the special FFT window 209. The special FFT window can be any size in theory. A large special FFT window can reduce the proportion of the extended CP to the special FFT size (i.e., reducing the overhead) and provide more ranging opportunities to reduce collision. Also, the time span of the transmission can also be extended so that there will be more signal power arriving at the BS for the same average transmit power. However, with a large special FFT window, the overall overhead of a ranging signal as a portion of the uplink sub-frame increases and the ranging signal also becomes more susceptible to channel time variations (e.g. mobility) that results in inter-carrier interference caused by Doppler shift. The choice of the special FFT size should also consider practical implementation. For example, in an OFDM system, making it an integer multiple of the regular FFT size may simplify the BS processing.

The total ranging overhead, which is the ratio of the duration of the dedicated basic ranging interval to the entire uplink sub-frame, depends only on the uplink sub-frame. The longer the uplink, the lower is the overhead. If the overhead due to the "dead interval" 204 delay becomes too excessive, the "dead interval" 204 can be omitted at the price of generating inevitable interference to the next symbol.

Referring to FIG. 3, a time-domain diagram shows an "extended" dedicated ranging interval 303 that is built upon the "basic" dedicated ranging interval 201, in accordance with some embodiments of the present invention. If more ranging opportunities are needed than what a basic ranging interval can provide, an extended ranging interval 303 can be defined where one or more regular OFDM symbols 301 and 302 with only a regular CP length may be added in front of the extended-CP special symbol. Initial ranging transmission is allowed only during the extended-CP interval, but other ranging transmissions are allowed everywhere. This design is an alternative to the case in which the special FFT size is enlarged, as described with reference to FIG. 2.

Referring to FIG. 4, a frequency-domain diagram of a variation of the extended dedicated ranging interval is shown, in accordance with some embodiments of the present invention. In these embodiments, the ranging signal is allowed to occupy only a portion of the system bandwidth instead of the entire bandwidth as before. For example, for the extended-CP symbol 401 (that is the same as extended CP symbol 202 in FIG. 2), a portion of the bandwidth 402 is dedicated to ranging, and the remaining bandwidth 403 is for data traffic. In fact, such a design in which the ranging and data traffic are multiplexed can be done using different data/ranging ratios for each symbol in the extended ranging interval such as that illustrated in FIG. 4, where the additional regular OFDM symbols 404 and 405 are used. The generic term "frequency-time ranging zone" is used for these cases.

Referring to FIG. 5, a time-domain diagram shows an exemplary ranging interval for an OFDM system similar to OFDM systems described by drafts and the published version of the IEEE 802.16 standard The ranging interval 501 is composed of one special OFDMA symbol with an extended CP that may be preceded by up to four regular OFDMA symbols each having a regular CP for providing more ranging opportunities if needed. The duration of the extended CP is signaled by the base in a control message sent from the BS (e.g., the UL-MAP message defined in draft and published versions of IEEE 802.16 standards) as an integer multiple of the regular CP. Similarly, the special FFT size of the extended-CP symbol, which may also be an integer multiple of the regular FFT size, is signaled in the control message as well. Immediately after the special OFDMA symbol, there is a "dead" interval that equals to the largest maximum timing difference. But it may be omitted to trade performance degradation for overhead reduction. The control message may indicate whether the dead interval is included. The duration of the dead interval is implicitly known to the SS and is equal to the difference between the extended-CP symbol duration and the regular CP duration.

Division of Ranging Opportunities in Frequency, Time, and Code Domains

Figure 6:
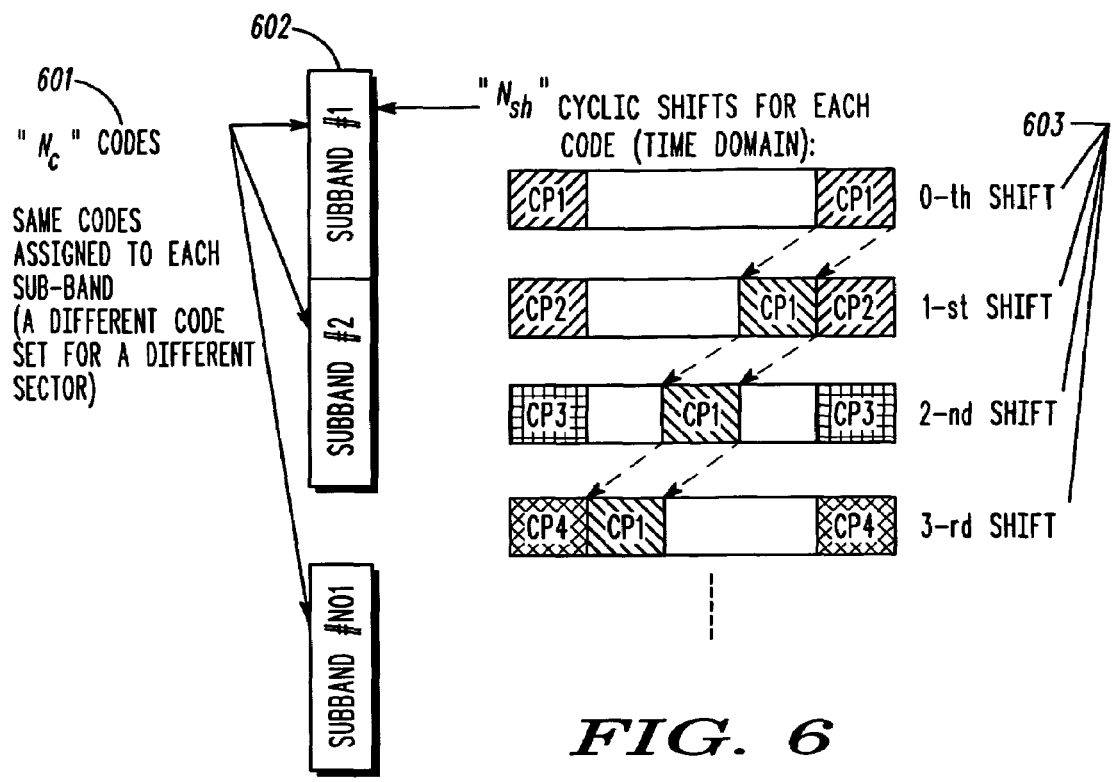
FIG. 6 is a block diagram of the division of ranging opportunities in frequency, time, and code domains, in accordance with some embodiments of the present invention.

Referring to FIG. 6, a block diagram shows the division of ranging opportunities in frequency, time, and code domains, in accordance with some embodiments of the present invention. Each random access signal is generated based on a ranging sequence (interchangeable with "access sequence" and "ranging code" and "access code") that is randomly chosen from a code group 601 allocated to the sector (the code group size is denoted herein as $N_c$, an integer). The access sequences used in a code group and the allocation of code groups to different sectors are specified later. The ranging sequence may be used to generate an access signal by directly modulating the contiguous sub-carriers in a frequency block (sub-band) that is randomly chosen among $N_{b1}$ sub-bands 602, wherein $N_{b1}$ is an integer including the value "1" known to both BS and SS. $N_{b1}$ may be determined based on the system bandwidth and be made known to the BS and the SS. The time-domain access signal is generated by performing an IFFT on the ranging sequence after modulating the chosen sub-band. Before a CP is inserted in front of the access signal to form a complete access waveform, the access signal may be cyclically (circularly) shifted in time domain, where the shift is chosen randomly among $N_{sh}$ allowed values 603 that are known to the BS and SS, wherein $N_{sh}$ is an integer. Lastly, a CP is added to form the final ranging waveform where the length of the CP is that of the extended CP for initial ranging and for other ranging, either the extended CP or the regular CP depending on the transmission point (discussed above). The duration of the waveform corresponds to the duration of one OFDM symbol in the extended ranging interval, in embodiments such as those described with reference to FIG. 3 and FIG. 5 In embodiments such as those described with reference to FIG. 5, the ranging sequence may be used to generate an access waveform by appending data symbols to the ranging sequence and directly modulating the contiguous sub-carriers in the frequency block (sub-band) that is randomly chosen, using terms of the appended ranging sequence.

More detail on the division of ranging opportunities in frequency, time, and code domains is as follows. Firstly, in the frequency domain, an entire frequency band is divided into $N_{b1}$ frequency blocks 602 ($N_{b1}$ sub-bands with K sub-carriers in each sub-band). A ranging signal may occupy only one sub-band. The reason for dividing the bandwidth into orthogonal blocks is for better flexibility. First, the number of ranging opportunities can be made adjustable to the bandwidth: larger bandwidth systems need to provide more opportunities than narrower bandwidth systems for a similar collision rate. Second, transmitting on a narrow sub-band allows power boost on that band to achieve a decent uplink SNR, even though narrowband transmission has lower timing resolution than wider bandwidth transmission ($N_{b1}$ channel taps will collapse into one channel tap when only $1/N_{b1}$ of the bandwidth is excited). On the other hand, the number of sub-carriers in each sub-band, which equals to the length of the ranging sequence code, affects the cross-correlation characteristics. For example, halving the number of sub-carriers in a sub-band allows a 3 dB transmit power boost on that band, but the potential interference from other co-channel ranging codes also increases by 3 dB. So the number of sub-carriers in a sub-band involves a tradeoff between SNR boost and interference sacrifice. In summary, the parameter $N_{b1}$ is specified by the BS based on the bandwidth (FFT size), uplink SNR requirement, timing precision requirement, suppression capability to potential co-channel interferences, and the number of ranging opportunities that needs to be provided. It should also be specified jointly with the other two parameters $N_c$ and $N_{sh}$ described in more detail below.

Secondly, in each sub-band, a number of ranging codes 601 (i.e., $N_c$ sequences) may be allowed. Since these ranging codes occupy the same band, they may interfere with each other even without any code collision. Sequences with good cross-correlation are much desired for better code detection and channel estimation. In addition, a low PAPRi of the time-domain ranging waveform is also much desirable in order to be able to boost the transmission power to improve the uplink SNR. The details of the sequences that have these desirable properties will be discussed in the next section. Additionally, for cellular deployment, a number of sequence groups (each having $N_c$ access sequences) are also required for allocating to different neighboring sectors. So when those codes are generated and grouped, any pair of codes from distinct groups needs to have good cross correlation, just like any pair of codes in the same group. In summary, the parameter $N_c$ is determined by the BS based on the access needs and the maximally tolerable interference level at which the successful detection rate is still good.

Thirdly, for each ranging code, $N_{sh}$ cyclic time shifts 603 of the time-domain ranging signal (phase rotation in frequency domain) can be used to further increase the number of ranging opportunities. Mathematically, the frequency domain sequence, after the $j^{th}$ shift is $$s_j(k)=s(k)e^{-j2\pi k(j-1)L/N_{FFT}}, \qquad (1)$$

where s(k) is the original (or $0^{th}$ shift) sequence, L is the CP length (regular or extended CP, depending on the type of ranging) and $N_{FFT}$ is the FFT size. In essence, code separability is achieved by the fact that the estimated channel is shifted in time domain by some multiples of L. If L is large enough to cover most of the channel length, the access signals using distinct cyclic shifts will allow their corresponding channels to be separated reasonably well.

The initial ranging transmission may be used by any SS that wants to synchronize to the system channel for the first time. In one embodiment of the invention, a control message from the BS may specify the sub-bands that an initial ranging signal can use. All sub-bands or, for example, a specified number of the sub-bands starting from the lowest frequency offset may be allowed for initial ranging. Maximally, only $N_{sh}=\lfloor N_{sp}/L_{CPe} \rfloor$ shifts are preferred for interference-free code separation among different shifts of a ranging signal where $\lfloor x \rfloor$ denotes the flooring function (i.e., the maximum integer that is not greater than x), $L_{Cpe}$ is the length of an extended CP and $N_{sp}$ is the FFT size of the special FFT symbol (209 of FIG. 2) that may be multiples of the regular FFT size N. If some interference between estimated channels can be tolerated, that maximal number may be even increased. In general, more shifts can be used at the expense of increased interference. But a good practice is setting the number of shifts to $N_{sh}'=\lfloor N_{sp}/L_{CPe} \rfloor-1$ so that a good estimation of the noise and interference level can be obtained from the "channel-free" IFFT samples. Since $L_{Cpe}$ can be significantly larger than the regular CP length (denoted as $L_{CP}$) used in an OFDM system (for non-OFDM that does not define a CP length, the duration of a regular CP, or $L_{CP}$, is often chosen based on the excessive delay spread of the channels encountered in a deployment, as discussed before), the allowed $N_{sh}$ can be significantly reduced. To improve the number of shifts available for other non-initial ranging functions, the initial ranging can be confined to a certain number of (say $N_{b1}'$) sub-bands on which the allowed number of shifts is, only for example, $N_{sh}'=\lfloor N_{sp}/L_{CPe}\rfloor-1$. But on the remaining $N_{b1}-N_{b1}'$ sub-bands, where only non-initial ranging is allowed, the number of shifts can be increased to $N_{sh}=\lfloor N_{sp}/L_{CP}\rfloor-1$. Often, the total ranging opportunities increases. If initial ranging is allowed on only $N_{b1}'(<N_{b1})$ sub-bands, the number of initial ranging opportunity is then $N_{sh}'*N_c*N_{b1}'$. If initial ranging is allowed on all sub-bands, the total number of all ranging opportunities is $N_{sh}'*N_c*N_{b1}$, of which a portion may be assigned to initial ranging.

Periodic-ranging transmissions are sent periodically for system periodic ranging. Bandwidth-requests transmissions are for requesting uplink allocations from the BS. These non-initial ranging transmissions may be sent only by SSs that have already synchronized to the system. These transmissions can also use the additional OFDM symbols if these symbols are allocated for ranging in a control message from the BS.

Ranging Codes

It is desirable to use ranging sequences that have low PAPR (peak to average power ratio) and good cross-correlation. A large PAPR requires more power backoff in order to avoid signal distortion. A reduced average transmit power resulting from using such power backoff causes a decrease of the uplink SNR, which can be problematic for the BS to detect the ranging signals from mobile devices with limited power. In OFDM, the PAPR is usually much higher than that in the traditional "single-carrier" transmission when the OFDM sub-carriers are modulated with random PSK/QAM symbols. For example, the PAPR for the access signals described in drafts and a published version of the IEEE 802.16 standard are in the range of 6.5 to 12 dB.

In terms of the other important sequence characteristic—the cross correlation, since distinct ranging signals can interfere with each other, a good cross correlation among them can mitigate the interference, which results in improved detection rate and reduced false alarm. The presence of other ranging codes on the same set of sub-carriers and at the same cyclic shift may severely distort the estimation of the desired channel if the cross correlation property is unsatisfactory. This results in low detection rate and high false alarm rate even just for the purpose of detecting the presence of a ranging code, needless to say the goal of obtaining accurate channel knowledge. The performance becomes more and more unacceptable as the channel conditions become worse (for example, under larger delay spread) or the number of ranging users increases.

In some embodiments of the present invention, the ranging signal uses access sequences that have good PAPR and cross correlation. In one embodiment of the invention, the set of sequences can come from a search of a special type of sequences such as random PSK or Golay PSK sequences so that the resulting set has good PAPR and cross correlation. In another embodiment of the invention, the sequence can be constructed more systematically from the Generalized Chirp Like (GCL) sequences which are non-binary unit-amplitude sequences. The GCL sequence used for ranging is expressed as $$s_u(k) = \exp\left\{-j2\pi u \frac{k(k+1)}{2N_G}\right\}, k = 0 \ldots N_G - 1 \text{ and} \quad (2)$$

$$u(\text{"class index"}) = 1 \ldots N_G - 1$$

where $N_G$ is the length of the GCL sequence (a prime number is preferred as will be explained later) and u is referred to as the class index that is a non-zero integer chosen between 1 and $N_G-1$. The GCL sequence has the following important properties:

Property 1: The GCL sequence has constant amplitude, and its $N_G$-point discrete Fourier Transform (DFT) has also constant amplitude.

Property 2: The GCL sequences of any length have an "ideal" cyclic autocorrelation (i.e., the correlation with the circularly shifted version of itself is a delta function)

Property 3: The absolute value of the cyclic cross-correlation function between any two GCL sequences is constant and equal to $1/\sqrt{N_G}$, when |u1−u2|, u1, and u2 are all relatively prime to $N_G$ (a condition that can be easily guaranteed if $N_G$ is a prime number).

The cross-correlation mentioned here is a sequence itself with each value corresponding to the correlation between two sequences where one of them is shifted by an integer number of elements (referred to as a "lag"). The cross-correlation $1/\sqrt{N_G}$ at all lags (Property 3) actually achieves the optimal cross-correlation value for any two sequences that have the ideal autocorrelation property (meaning that the theoretical minimum of the maximum value of the cross-correlation over all lags is achieved). The minimum is achieved when the cross correlations at all lags equal to $1/\sqrt{N_G}$. This property is important since several interfering sequences are used in each sub-band and in each sector (more interferers if in a multi-sector environment). The cross correlation property allows the interfering signal be evenly spread in the time domain after correlating the received signal with the desired sequence. Hence, at least the significant taps of the desired channel can be detected more reliably.

It should also be noted that an arbitrary scalar phase shift applied to a GCL sequence also results in a GCL sequence that has the optimal cyclic cross-correlation and ideal auto-correlation. Also, if an $N_G$-point DFT (Discrete Fourier Transform) or IDFT (inverse DFT) is taken on each GCL sequence, the member sequences of the new set also have optimal cyclic cross-correlation and ideal autocorrelation, regardless of whether or not the new set can be represented in the form of equation (2). In fact, sequences formed by applying a matrix transformation on the GCL sequences also have optimal cyclic cross-correlation and ideal autocorrelation as long as the matrix transformation is unitary. For example, the $N_G$-point DFT/IDFT operation is equivalent to a size-$N_G$ matrix transformation where the matrix is an $N_G$ by $N_G$ unitary matrix. As a result, sequences formed based on unitary transformations performed on the GCL sequences still fall within the scope of the invention, because the final sequences are still constructed from GCL sequences. That is, the final sequences are substantially based on (but are not necessarily equal to) the GCL sequences. In general, the number of sub-carriers in a sub-band is often not a prime number. In this case, in one embodiment, the smallest prime number is chosen that is larger than the desired length, and the GCL sequence is truncated to the desired length. Alternatively in another embodiment, the largest prime number that is smaller than the desired length is chosen and the GCL sequence is cyclically extended to the desired length. Other modifications of the GCL sequence may be allowed in the same spirit to approximate the good properties as much as possible. When such a modification is performed, the three previously described properties will only hold approximately, but it is found that they still hold very well, especially when the sequence is reasonably long. For example, the absolute correlation values for all lags of the cross correlation between any sequence pair are still very evenly distributed such that the maximum absolute correlation value over all lags is no more than two times the average of the absolute correlation values of the cross correlation. This is a good cross-correlation.

Constant amplitude in Property 3 means that the sub-carriers are excited evenly to allow unbiased channel estimation. When GCL sequence is applied onto all OFDM sub-carriers (or onto uniformly spaced sub-carriers), the time domain signals also have constant amplitudes. But due to the guard sub-carriers used in all practical OFDM systems and possible sub-band excitation, the time domain waveform is equivalent to an oversampled discrete-time sequence after passing through a "sinc" pulse-shaping filter. The resulting PAPR will not have exactly constant amplitude, but a large number of the GCL sequences still generate waveforms with low PAPRs. For any particular sequence length NG, there are a large number ($N_G-1$) of GCL sequences, so the classes of GCL sequences that give good PAPR can be chosen as the ranging codes while the good cross correlation among them is approximately kept. Using this method, an average PAPR that is substantially lower than the PAPR of the ranging waveforms currently described in drafts and a published version of an IEEE 802.16 standard can be obtained. For example, an average PAPR range of 2.5-5 dB can be achieved (versus 6.5-12 dB in IEEE 802.16-2004) by aspects of the present invention with a sequence length of approximately 100. The present invention can provide enough sequences with an average PAPR of less than 6 dB in many situations.

These sequences may then be divided into a number (denoted as Ngr) of equal-size code groups, each of which is to be assigned to a cell/sector. The number of sequences in each code group is Nc, and the number of groups Ngr may be predetermined according to Nc and the total number of sequences with good PAPRs. One example of assigning a code group to a cell/sector is to use the following simple mapping Group Index=mod(Decimal number corresponding to
the last five bits of cell ID, Ngr)     (3)

Other more sophisticated cell planning is possible with the goal of assigning groups so that the possible interference from neighboring cells/sectors is minimized.

In other embodiments of the present invention, the access sequences can be based on arbitrary sequences. (e.g., sequences generated from a PRBS (Psuedo Random Binary Sequence) generator, random PSK, Golay PSK sequences, or sequences from an arbitrary constellation.) The access sequences based on arbitrary sequences may not necessarily have good PAPR and cross correlation properties but in some cases (e.g. binary sequences) may provide simpler sequence generation/storage/processing.

Figure 7:
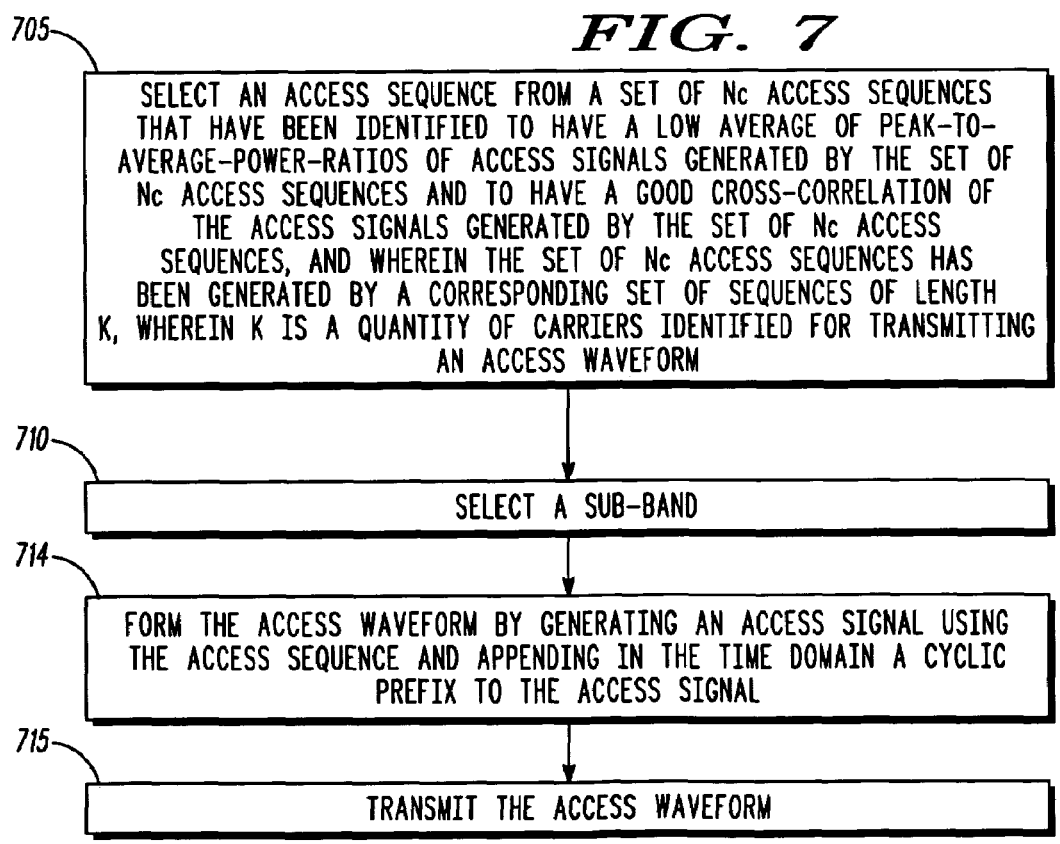
FIGS. 7 and 8 are flow charts of methods of accessing a communication system, in accordance with some embodiments of the present invention.

Referring to FIG. 7, a flow chart shows some steps of methods used in a subscriber station, such as any of the subscriber stations 101, 102, 103 (FIG. 1) when operating as described herein, in accordance with some embodiments of the present invention. At step 705 an access sequence is selected from a set of $N_c$ access sequences that have been identified to have a low average of peak-to-average-power-ratios of access signals generated by the set of $N_c$ access sequences and to have a good cross-correlation of the access signals generated by the set of $N_c$ access sequences, and wherein the set of $N_C$ access sequences has been generated by a corresponding set of sequences of length K, wherein K is a quantity of sub-carriers identified for transmitting an access signal. At step 710, the sub-band in which the signal is transmitted is randomly selected in some implementations. At step 714, the access waveform is formed by generating an access signal using the access sequence and appending in the time domain a cyclic prefix to the access signal. Since the access sequence is used to modulate the subcarriers in the chosen sub-band, the time-domain access signal can be conveniently generated by taking an Inverse Fast Fourier Transformation (IFFT) of the frequency-domain sequence, in one embodiment. The frequency-domain sequence, whose length equals the total number of subcarriers, is preferably the zero-padded ranging sequence (i.e., the ranging sequence at the subcarrier locations of the chosen sub-band and zeros elsewhere). In the case of frequency multiplexing the ranging with data traffic (FIG. 4), the frequency-domain sequence preferably comprises the access sequence, zeros as needed, and the data sequence. At step 715, the access waveform is transmitted.

Figure 8:
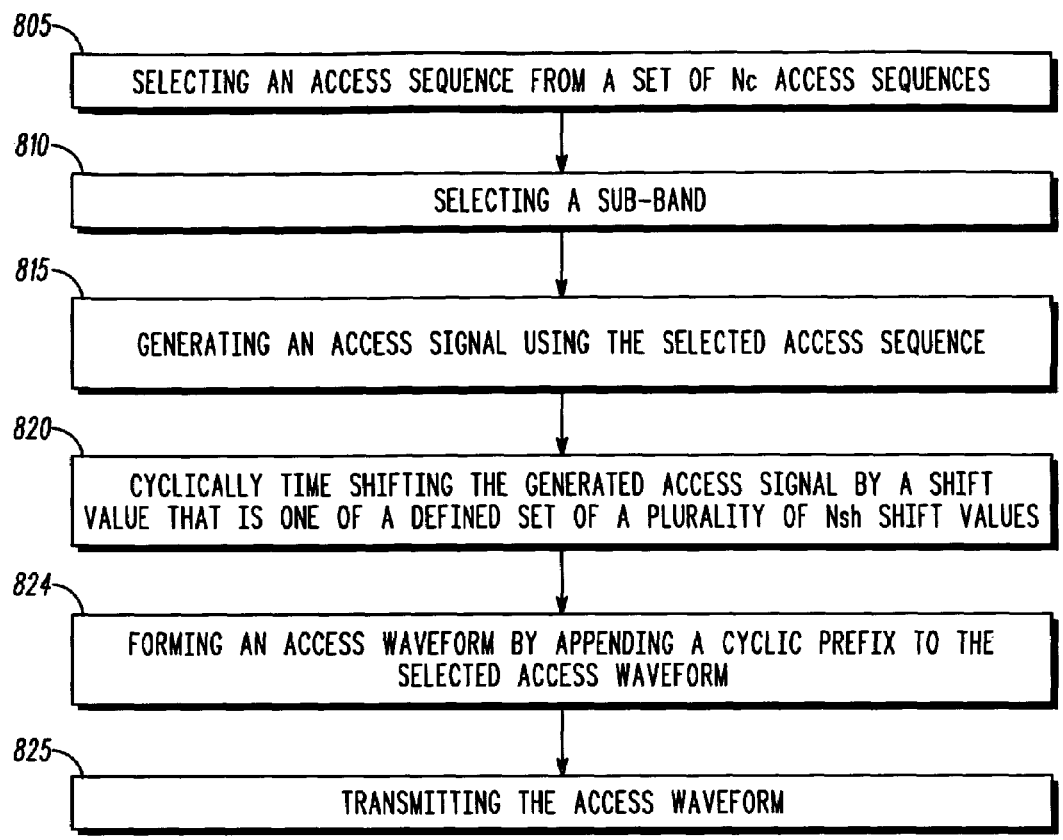

Referring to FIG. 8 a flow chart shows some steps of methods used in a subscriber station, such as any of the subscriber stations 101, 102, 103 (FIG. 1) when operating as described elsewhere herein, in accordance with some embodiments of the present invention. At step 805 an access sequence is selected from a set of Nc access sequences. At step 810 the sub-band of K sub-carriers in which the ranging signal is going to be transmitted is randomly selected in some implementations. At step 815 an access signal is generated using the selected access sequence. At step 820 the generated access signal is cyclically time shifted by a shift value that is one of a defined set of $N_{sh}$ shift values. At step 825, an access waveform is formed by appending a cyclic prefix in front of the generated access signal. At step 825 the access waveform is transmitted using a sub-band of K sub-carriers.

Control Signaling

The BS may signal to all the SS's the definition of the ranging zone, the division of the frequency, time, and code domains, and the code grouping information. This signaling mechanism is essential to allow a flexible ranging scheme that can adjust the overhead and performance according to the deployment system parameters (e.g., bandwidth, cell size, etc.) and the access traffic need.

In one example of the invention targeted specifically to systems designed to IEEE 802.16 standards, the control message is contained in the UL-MAP message in the following form:

| Syntax | Size | Notes |
|---|---|---|
| OFDMA Symbol Offset | 8 bits | |
| No. Additional OFDMA Symbols | 2 bits | Number (up to 3) of regular OFDMA symbols used for BW request and periodic ranging, in addition to the last special OFDMA symbol with the extended CP |
| Extended CP Length | 3 bits | In multiples of the regular CP length (Up to 8 times of regular CP length) |
| FFT size of the extended-CP symbol | 2 bits | The FFT size of the special symbol with extended-CP can be multiples (up to 4 times) of the regular FFT size |

-continued

| Syntax | Size | Notes |
| --- | --- | --- |
| Dead Interval Flag | 1 bit | 1: Include the "dead" interval after the extended CP; 0: Do not include for overhead reduction |
| Num Sub-bands | 5 bits | Divide the whole band into up to 32 sub-bands |
| Num Sub-bands for Initial Ranging | 3 bits | "000": Initial ranging can use all sub-bands "001": Uses the first sub-band "010": Uses the first two sub-bands and so on, and lastly "111": Uses the first seven sub-bands |
| } | | |

Figure 9:
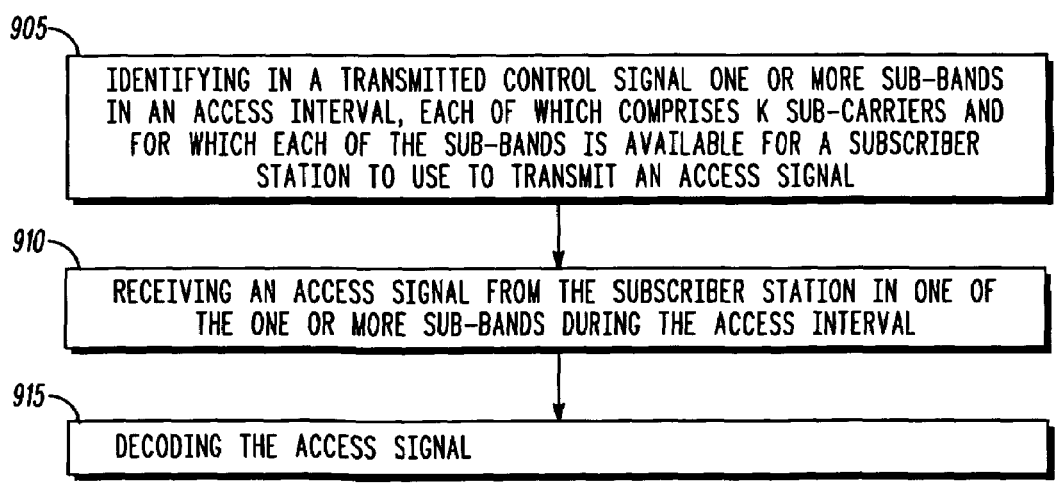
FIGS. 9 and 10 are methods used by a base station in a wireless communication system for facilitating an access of the communication system by a subscriber station, in accordance with some embodiments of the present invention.

Referring to FIG. 9, a flow chart shows a method used by a base station in a wireless multi-carrier communication system for facilitating an access of the communication system by a subscriber station, in accordance with some embodiments of the present invention. At step 905, a transmitted control signal from the BS identifies one or more sub-bands in an access interval, each of which comprises K sub-carriers and for which each of the sub-bands is available for a subscriber station to use to transmit an access signal. At step 910, an access signal is received from the SS in one of the one or more sub-bands during the access interval. At step 915, the access signal is decoded.

Receive Processing at the Base Station

The uplink processing is discussed here to illustrate how the cross correlation property can be taken advantage of. Basically, a time-domain channel corresponding to each ranging user (i.e., subscriber station performing an access function) will be detected through a correlation process that can be performed efficiently in the frequency domain. For initial ranging users, the timing offset also needs to be extracted, which is straightforward after the channel is estimated in the process. The signal and interference power can also be estimated in the process.

Ranging Code Detection

The detection of the presence of a ranging code is often performed by comparing a pre-set threshold with the ratio of the peak of the estimated channel to the estimated noise floor.

At the BS, an N-point FFT of the received signal at the appropriate FFT window is preferably performed first. The start of the appropriate window is known to the BS after the special FFT window (209 of FIG. 2) and the extended CP length (203 of FIG. 2) is designed. The received data on all sub-bands is then obtained. A bank of $N_c$ detector/estimators run in parallel for each of the $N_{b1}$ sub-bands, using the data resulted from taking an N-point FFT of the received signal at the appropriate FFT window. The processing described below is generalized to multiple BS antenna cases. Let the frequency domain data for receive antenna m (m=1 . . . M) be $Y_m(k)$ where k is a data sub-carrier in a sub-band. Note that $Y_m(k)$ consists of possibly more than one ranging code. $Y_m(k)$ will be correlated with all $N_c$ ranging sequence candidates. The correlation is performed in the frequency domain and then transformed back to the time domain. In other words, we first multiply $Y_m(k)$ by a conjugate of each of the GCL candidates as follows:

$$\tilde{H}_m(k) = Y_m(k) S_u^*(k) \quad (4)$$

Next the noisy estimates are transformed to the time domain through a P-point IFFT as:

$$\tilde{h}_m(l) = \frac{1}{P} \sum_{k=0}^{K-1} \tilde{H}_m(k) w(k - K/2) e^{j2\pi lk/P} \quad 0 \le l \le P-1 \quad (5)$$

where K is the number of sub-carriers in the sub-band and the IFFT size P can be chosen as the smallest power-of-2 integer that is larger than K. w(k) is an optional weighting window applied onto the noisy frequency response. The windowing is to reduce the power leakage problem caused by the discontinuity from the edge of the band to null sub-carriers (since zeros are inserted in place of the null sub-carriers before the IFFT). It can be thought as an artificial pulse-shaping filter that is a "sinc" function if a flat weighting is applied. The pulse-shaping filter can reduce the tail effect so that there will be fewer taps in $\tilde{h}_m(l)$ introduced by "sinc" pulse shaping, rather than by true multipaths. An example is the traditional raised cosine pulse shaping whose tails decay much faster than that in the "sinc" function case. Similar to a raised cosine function, a "Hanning" window can be used, i.e., $$w(k) = \left(0.5 + 0.5 \cos \frac{2\pi k}{\Gamma}\right), \quad (6)$$

where the parameter $\Gamma$ controls the shape of the window (an infinite $\Gamma$ means a flat window). $\Gamma$ should be larger than K.

In the case of a cyclic time-domain shift is used for the ranging code, as in (1), the ranging users' channels are separable in the time domain from $\tilde{h}_m(l)$ in (5). This means that an estimate of $n^{th}$ user channel is simply contained in samples (n−1)L through nL−1 of (5) where L is the same CP length in (1). Basically, the receiver processes the access signal to obtain a sequence of time domain values (i.e., $\tilde{h}_m(l)$) of a length that equals to the IFFT size P. Then, for each of the allowed cyclic shift (say "n"), the receiver analyzes the subset of the time domain samples according to n, i.e., the samples indexed from (n−1)L through nL−1 in (5). All allowed cyclic shifts will be examined in the random access case.

If the last $L_{CPe}$ is "channel-free", an estimation of the noise plus interference level (within some scaling) for each of the M antennas can be obtained by averaging $|\tilde{h}_m(l)|^2$ for l=P−$L_{CPe}, \ldots$, P−1, i.e., $$\sigma_m^2 = \frac{1}{L_{CPe}} \sum_{l=P-L_{CPe}}^{P-1} |\tilde{h}_m(l)|^2 \quad (7)$$

The detection variable for the $n^{th}$ shift ranging user is then calculated as $$z_n = \sum_{m=1}^{M} \frac{\max_{l=(n-1)L_{CPe}}^{nL_{CPe}-1} |\tilde{h}_m(l)|^2}{\sigma_m^2} \quad (8)$$

This detection variable will be compared with a threshold. If $z_n$ is greater than the threshold, detection is declared. A larger threshold value reduces the false alarm probability, but it also increases the probability of a "miss".

Another type of detection variable is the ratio between the peak and the mean power value, i.e., $$z'_n = \sum_{m=1}^{M} \frac{\max_{l=(n-1)L_{CPe}}^{nL_{CPe}-1} |\tilde{h}_m(l)|^2}{1/L_{CPe} \sum_{l=(n-1)L_{CPe}}^{nL_{CPe}-1} |\tilde{h}_m(l)|^2} \quad (8)$$

This detection value may be used when there is no "channel-free" region to estimate the noise floor.

Timing Offset Estimation

The timing offset can be estimated in the following way. First, over the region of the extended CP ($L_{CPe}$), a rectangular window of width $L_{CP}$ slides through this extended-CP window. The estimated signal power is computed recursively as $$x_n(i) = \sum_{m=1}^{M} \sum_{l=(n-1)L_{CPe}+i}^{(n-1)L_{CPe}+i+L_{CP}} |\tilde{h}_m(l)|^2, \quad (9)$$

for $i = 0, 1, \ldots, L_{CPe} - L_{cp} - 1$ $x_n(i)$ will exhibit a plateau whose width depends on the number of "valid" timing compensation values. Ideally, the right edge of the plateau corresponds to the correct timing offset estimation. However, if the channel length L is smaller than the regular CP length $L_{CP}$, then $L_{CP}$–L sampling points before the correct timing point are all "valid" choices in the sense of not causing any SNR degradation. One conservative way to choose the timing point within the plateau is to choose the mid-point between the peak and the right edge of the plateau (defined as the point that $x_n(i)$ first falls below a certain percentage (say 95%) of the peak). Instead of trying to estimate the true timing offset and risking a significant SNR degradation occurred even when the estimate is just a few taps later than the true timing, this approach chooses a conservative timing advance compensation point that can often be earlier than the true timing offset, but the degradation of SNR is guaranteed to be minimal.

Channel Estimation

The channel of the ranging user can also be estimated reasonably well if needed. This information can be helpful for closed loop antenna processing. To improve the channel estimation under low SINRs, a tap-selection or "de-noising" strategy is important. Tap selection simply means that the channel taps below some threshold, $\eta$, are set to zero. Hence, tap selection improves the channel estimation for relatively sparse channels by attempting to match the channel estimator to the instantaneous power delay profile for each user. A threshold of $\eta=3$ dB stronger than the estimated $\sigma_m^2$ is an example of reasonable choices.

Let the time-domain channel estimate for a ranging user after tap selection be denoted as $\hat{h}_n(l)$ for $0 \leq l \leq L_{CP}-1$. Then the frequency-domain channel estimate for that sub-band is the P-point FFT of $\hat{h}_n(l)$:

$$H_n(k) = \frac{1}{w(k-K/2)} \sum_{l=0}^{L-1} \hat{h}_n(l) e^{-j2\pi lk/P} \quad 0 \leq k \leq P-1 \quad (10)$$

Figure 10:
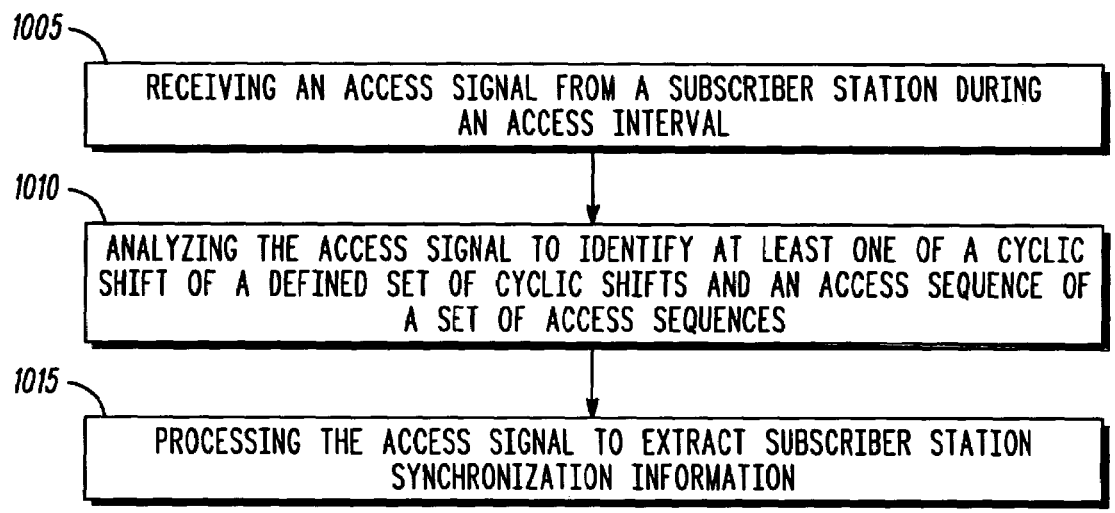

Referring to FIG. 10 a flow chart shows a method used by a base station in a wireless communication system for facilitating an access of the communication system by a subscriber station, in accordance with some embodiments of the present invention. At step 1005, an access signal is received from a subscriber station during an access interval. At step 1010, the access signal is analyzed to identify at least one of a cyclic shift of a defined set of cyclic shifts and an access sequence of a set of access sequences. The method may include, at step 1015, processing the access signal to extract subscriber station synchronization information. The subscriber station synchronization information may include, but is not limited to such characteristics as timing, power, frequency offset, and channel impulse response.

Although the invention is a method for random access and uplink timing synchronization, it is also applicable with minor modification to application cases where the uplink transmissions are assigned and anticipated by the BS, instead of being randomly chosen by the SS. One example for such a case is the use of the method described herein to realize the function of an SS acknowledging the successful or unsuccessful reception of the message sent previously from the BS to the SS. In this case, a detection of the assigned sequence may correspond to some information, for example, the indicator of a successful reception.

It will be appreciated the base and subscriber stations described herein may be comprised of one or more conventional processors and unique stored program instructions that control the one or more processors to implement, in conjunction with certain non-processor circuits, some, most, or all of the functions of the base and subscriber stations described herein. The non-processor circuits may include, but are not limited to, a radio receiver, a radio transmitter, signal drivers, clock circuits, power source circuits, and user input devices. As such, these functions may be interpreted as steps of a method to perform accessing of a communication system. Alternatively, some or all functions could be implemented by a state machine that has no stored program instructions, in which each function or some combinations of certain of the functions are implemented as custom logic. Of course, a combination of the two approaches could be used. Thus, methods and means for these functions have been described herein.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

It is further understood that the use of relational terms, if any, such as first and second, top and bottom, and the like may be used solely to distinguish one entity or action from another entity or action without necessarily requiring or implying any actual such relationship or order between such entities or actions.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

A "set" as used herein, means a non-empty set (i.e., for the sets defined herein, comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically.

The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method used by a subscriber station in a wireless communication system for accessing the communication system, comprising:

selecting an access sequence from a set of $N_c$ access sequences that have been identified to have a low average of peak-to-average-power-ratios of access signals generated by the set of $N_c$ access sequences and to have good cross-correlation of the access signals generated by the set of $N_c$ access sequences, and wherein the set of $N_c$ access sequences has been generated by a corresponding set of sequences of length K, wherein K is a quantity of sub-carriers identified for transmitting an access signal;

forming the access waveform by generating an access signal using the access sequence and appending in the time domain a cyclic prefix to the access signal; and transmitting the access waveform, wherein the corresponding set of sequences of length K is based on a set of ($N_G$−1) Generalized Chirp Like (GCL) sequences that are defined as:

$$s_u(k) = \exp\left\{-j2\pi u \frac{k(k+1)}{2N_G}\right\}, k = 0 \ldots N_G - 1 \text{ and}$$

$$u(\text{"class index"}) = 1 \ldots N_G - 1$$

wherein $N_G$ is a prime number that is one of the next number larger than K that is prime, the next number smaller than K that is prime, and K when K is prime.

2. The method according to claim 1, wherein the access signal is generated by performing an Inverse Fast Fourier Transform on a frequency domain sequence formed from the access sequence.

3. The method according to claim 1, further comprising selecting at random a frequency sub-band having K sub-carriers from among $N_{b1}$ sub-bands.

4. The method according to claim 1, wherein the selection of the access sequence from the set of $N_c$ access sequences is made as a random selection among the $N_c$ access sequences.

5. The method according to claim 1, wherein the low average of the peak-to-average-power-ratios of the entire set of $N_c$ access signal is less than 6 dB.

6. The method according to claim 1, wherein when $N_G$ is larger than K, the corresponding set of sequences of length K is generated by truncating the set of GCL sequences to length K.

7. The method according to claim 1, wherein when $N_G$ is smaller than K, the corresponding set of sequences of length K is generated by copying (K−$N_G$) terms from the beginning of each GCL sequence and appending them to the end.

8. The method according to claim 1, wherein the corresponding set of sequences of length K is generated by a random phase shift keyed sequence or a Golay phase shift keyed sequence.

9. The method according to claim 1, further comprising cyclically time shifting the access signal by a shift value that is one of a defined set of $N_{sh}$ shift values.

10. The method according to claim 1 wherein the length of the cyclic prefix appended to the access signal in the time domain is determined based on the maximum timing difference among all possible subscriber locations and the excessive delay spread of the channel in the deployment environment.

11. The method according to claim 1 wherein the accessing of the communication system is by one of a random transmission and an assigned uplink transmission.

12. A method used by a subscriber station in a wireless communication system for accessing the communication system, comprising:

selecting an access sequence from a set of $N_c$ access sequences;

generating an access signal by performing an Inverse Fast Fourier Transform of the selected access sequence;

cyclically time shifting the generated access signal by a shift value that is one of a defined set of $N_{sh}$ shift values;

forming an access waveform by appending a cyclic prefix to the selected cyclically shifted access signal; and transmitting the access waveform, wherein the number of shift values $N_{sh}$ is determined based on $\lfloor N_{sp}/L_{CPe} \rfloor$, wherein $N_{sp}$ is the Fast Fourier Transform size of a special Fast Fourier Transformation window, and $L_{CPe}$ is a length of an extended cyclic prefix of a special orthogonal frequency division multiplex symbol.

13. A method used by a subscriber station in a wireless communication system for accessing the communication system, comprising:

selecting an access sequence from a set of $N_c$ access sequences;

generating an access signal by performing an Inverse Fast Fourier Transform of the selected access sequence;

cyclically time shifting the generated access signal by a shift value that is one of a defined set of $N_{sh}$ shift values;

forming an access waveform by appending a cyclic prefix to the selected cyclically shifted access signal; and transmitting the access waveform, wherein the number of shift values $N_{sh}$ is determined based on $\lfloor N_{sp}/L_{CP} \rfloor$, wherein $N_{sp}$ is the Fast Fourier Transform size of a special Fast Fourier Transformation window, and $L_{CP}$ is determined based on an excessive delay spread of the channels encountered in a deployment.

14. The method according to claim 12, further comprising selecting at random a frequency sub-band having K sub-carriers from among $N_{b1}$ sub-bands.

15. The method according to claim 13, further comprising selecting at random a frequency sub-band having K sub-carriers from among $N_{b1}$ sub-bands.

16. A method used by a base station in a wireless communication system for facilitating an access of the communication system by a subscriber station comprising:

receiving an access signal from the subscriber station in an access waveform, wherein the access waveform has been formed by selecting an access sequence from a set of $N_c$ access sequences that have been identified to have a low average of peak-to-average-power-ratios of access signals generated by the set of $N_c$ access sequences and to have good cross-correlation of the access signals generated by the set of $N_c$ access sequences, and wherein the set of $N_c$ access sequences has been generated by a corresponding set of sequences of length K, wherein K is a quantity of sub-carriers identified for transmitting an access signal;

forming the access waveform by generating an access signal using the access sequence and appending in the time domain a cyclic prefix to the access signal; and transmitting the access waveform, wherein the corresponding set of sequences of length K is based on a set of ($N_G$–1) Generalized Chirp Like (GCL) sequences that are defined as:

$$s_u(k) = \exp\left\{-j2\pi u \frac{k(k+1)}{2N_G}\right\},$$
$$k = 0 \ldots N_G - 1 \text{ and (``class index'')} = 1 \ldots N_G - 1$$

wherein $N_G$ is a prime number that is one of the next number larger than K that is prime, the next number smaller than K that is prime, and K when K is prime; and analyzing the access signal to identify the selected access sequence.

17. The method according to claim 16, further comprising processing the access signal to extract subscriber station synchronization information.

18. The method according to claim 17, wherein the subscriber station synchronization information is at least one of timing, power, frequency offset, and channel impulse response.

19. The method according to claim 1, wherein the set of access sequences of length K based on a set of ($N_G$–1) GCL sequences are obtained from a transformation of the set of GCL sequences.

20. The method according to claim 19, wherein the transformation comprises one of a Discrete Fourier Transformation and applying a unitary matrix on a GCL sequence.

21. A subscriber station, comprising:

a processor that:

selects an access sequence from a set of $N_c$ access sequences that have been identified to have a low average of peak-to-average-power-ratios of access signals generated by the set of $N_c$ access sequences and to have good cross-correlation of the access signals generated by the set of $N_c$ access sequences, and wherein the set of $N_c$ access sequences has been generated by a corresponding set of sequences of length K, wherein K is a quantity of sub-carriers identified for transmitting an access signal, and forms the access waveform by generating an access signal using the access sequence and appending in the time domain a cyclic prefix to the access signal; and a transmitter that transmits the access waveform, wherein the corresponding set of sequences of length K is based on a set of ($N_G$–1) Generalized Chirp Like (GCL) sequences that are defined as:

$$s_u(k) = \exp\left\{-j2\pi u \frac{k(k+1)}{2N_G}\right\},$$
$$k = 0 \ldots N_G - 1 \text{ and } u(\text{``class index''}) = 1 \ldots N_G - 1$$

wherein $N_G$ is a prime number that is one of the next number larger than K that is prime and the next number smaller than K that is prime, and K when K is prime.

* * * * *